US012199362B2

(12) United States Patent
Jin et al.

(10) Patent No.: US 12,199,362 B2
(45) Date of Patent: Jan. 14, 2025

(54) PATCH ANTENNA STRUCTURE AND AN ANTENNA FEEDER BOARD WITH ADJUSTABLE PATTERNS

(71) Applicant: Samsung Electronics Co., Ltd., Suwon-si (KR)

(72) Inventors: Lukui Jin, Guangzhou (CN); Bingjian Niu, Guangzhou (CN); Lei Cai, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 17/309,361

(22) PCT Filed: Dec. 5, 2018

(86) PCT No.: PCT/KR2018/015335
§ 371 (c)(1),
(2) Date: May 21, 2021

(87) PCT Pub. No.: WO2020/116676
PCT Pub. Date: Jun. 11, 2020

(65) Prior Publication Data
US 2022/0021119 A1 Jan. 20, 2022

(51) Int. Cl.
*H01Q 1/50* (2006.01)
*H01Q 9/04* (2006.01)

(52) U.S. Cl.
CPC ............. *H01Q 9/0435* (2013.01); *H01Q 1/50* (2013.01)

(58) Field of Classification Search
None
See application file for complete search history.

(56) References Cited

U.S. PATENT DOCUMENTS 4,737,793 A * 4/1988 Munson ............... H01Q 9/0435 342/361
6,252,553 B1 6/2001 Solomon
(Continued)

FOREIGN PATENT DOCUMENTS

CN 1979951 A * 6/2007
CN 108539413 A 9/2018
(Continued)

OTHER PUBLICATIONS

International Search Report and Written Opinion of the International Searching Authority in connection with International Application No. PCT/KR2018/015335 issued Aug. 29, 2019, 9 pages.

*Primary Examiner* — Dameon E Levi
*Assistant Examiner* — Anh N Ho

(57) ABSTRACT

A patch antenna structure includes a metal substrate, a feeding patch connected to the metal substrate, and a first feeding line disposed on the feeding patch, a first feeding point and a second feeding line connected in the first feeding line, and a second feeding point connected in the second feeding line, the first feeding line and the second feeding line intersect at a node. A length of the first feeding line between the node and the first feeding point and a length of the second feeding line between the node to the second feeding point are set equal. A switching component for changing the relative phase between the first feeding point and the second feeding point is provided in the first feeding line and/or in the second feeding line.

18 Claims, 2 Drawing Sheets

(56) References Cited

U.S. PATENT DOCUMENTS

| | | | | |
|---|---|---|---|---|
| 6,741,208 | B1 * | 5/2004 | West | H01Q 25/02 342/155 |
| 7,847,748 | B1 * | 12/2010 | McKinley | H01Q 9/0435 343/756 |
| 2003/0193377 | A1 * | 10/2003 | Quan | H01P 5/10 333/164 |
| 2005/0073461 | A1 | 4/2005 | Norvell et al. | |
| 2009/0051618 | A1 * | 2/2009 | Park | H01Q 21/245 343/893 |
| 2009/0121953 | A1 | 5/2009 | Boisbouvier et al. | |
| 2012/0007785 | A1 * | 1/2012 | Amari | H01Q 9/0407 343/722 |
| 2013/0076585 | A1 * | 3/2013 | Kim | H01Q 9/0435 343/700 MS |
| 2014/0292595 | A1 | 1/2014 | Kim et al. | |

FOREIGN PATENT DOCUMENTS

| | | | | | |
|---|---|---|---|---|---|
| CN | 113067129 | A | * | 7/2021 | H01Q 1/2225 |
| JP | H-09284031 | A | * | 10/1997 | |
| KR | 20120117566 | A | * | 10/2012 | |

* cited by examiner

PATCH ANTENNA STRUCTURE AND AN ANTENNA FEEDER BOARD WITH ADJUSTABLE PATTERNS

CROSS-REFERENCE TO RELATED APPLICATION

This application is a National Phase Entry of PCT international Application No. PCT/KR2018/015335, which was filed on Dec. 5, 2018, the disclosure of which is incorporated herein by reference.

BACKGROUND

1. Field

Embodiments of the present disclosure relate to communication equipment, and more particularly to a patch antenna structure and an antenna feeder board with adjustable patterns.

2. Description of Related Art

In the prior art, omnidirectional antenna and directional antenna switching technology can be divided into the following two categories: changing the physical shape of the antenna radiating element, switching and collaboration of multiple antenna groups. The change of the physical shape, especially the change of the overall shape of the antenna (bending and folding, etc.) is difficult to implement, and has a great disadvantage compared to the switching by the software; in addition, the base station antenna needs different types of patterns when installing on the wall and in the ceiling respectively, that is, the ceiling requires an omnidirectional antenna, and the wall requires a directional antenna. Multi-antenna technology results in a larger antenna size and higher cost. In addition, the currently known technical solutions for changing the shape of the radiating element to reconstruct the pattern have not been able to achieve omnidirectional and directional switching.

SUMMARY

The technical problem to be solved by the present invention is to provide a patch antenna structure and an antenna feeder board with adjustable patterns, which can realize switching or scanning of two patterns by using a set of antennas, simplify design and save cost; and achieve reasonable structural design, effectively control the direction of the circuit and have less influence on the radiation pattern.

To achieve above-mentioned object of the claimed invention, a patch antenna structure with adjustable patterns comprising:

- a metal substrate, a feeding patch connected to said metal substrate, and a first feeding line disposed on said feeding patch, a first feeding point and a second feeding line connected in said first feeding line, and a second feeding point connected in said second feeding line, said first feeding line and said second feeding line intersect at a node,
- wherein the length of said first feeding line between said node and said first feeding point and the length of said second feeding line between said node to said second feeding point are set equal;
- a switching component for changing the relative phase between said first feeding point and said second feeding point is provided in said first feeding line and/or in said second feeding line, and said switching component includes any of a switching circuit, a phase shifter, and a 0 ohm resistor.

Advantageously, said patch antenna structure further includes an adjustment component for adjusting mismatch in relative phase switching process between said first feeding point and said second feeding point.

Advantageously, said adjustment component includes a matching transmission line or adjustable capacitor which is connected in said first feeding line and/or in said second feeding line.

Advantageously, said switching circuit includes a first single-pole single-throw switch disposed in said first feeding line between said node and said first feeding point, a single-pole double-throw switch 222 disposed in said second feeding line between said node and said second feeding point and a third feeding line, the third feeding line is connected to said single-pole double-throw switch and said second feeding line between said node and said second feeding point, wherein said single-pole double-throw switch controls whether said second feeding line between said node and said second feeding point is connected to said third feeding line.

Advantageously, said third feeding line is a feed transmission line that is bent by 180 degrees.

Advantageously, said adjustment component is a matching transmission line, said adjustment component further includes a second single-pole single-throw switch connected to said node and said second single-pole single-throw switch controls whether said matching transmission line is connected to said node.

Advantageously, when said second single-pole single-throw switch is turned off, said first single-pole single-throw switch is turned on, and said single-pole double-throw switch is turned to the vertical direction, said first feeding point and said second feeding point is fed in phase, and said patch antenna produces an omnidirectional pattern.

Advantageously, when said second single-pole single-throw switch is turned off, said first single-pole single-throw switch is turned on, and said single-pole double-throw switch is turned to the horizontal direction, said first feeding point and said second feeding point are fed in reverse, and said patch antenna produces a directional pattern.

Advantageously, said switching component is a 0 ohm resistor which is disposed in said first feeding line between said node and said first feeding point and/or in said second feeding line between said node and said second feeding point.

An antenna feeder board comprising above-mentioned patch antenna structure with adjustable patterns is also provided.

Performing the patch antenna structure and the antenna feeder board with adjustable patterns of the present invention will bring out the following beneficial effects:

Firstly, a switching component for changing a relative phase between the first feeding point and the second feeding point is provided in the first feeding line and/or in the second feeding line, and the switching component comprises any of a switching circuit, a phase shifter and a 0 ohm resistor and can switch or scan two patterns with a set of antennas by switching the switching component, simplifying design and saving costs.

Secondly, the switching circuit is arranged in the feeding circuit being away from the radiation element, and has less influence on the radiation pattern, and the control circuit of the switch has a short wiring which is convenient for layout.

Thirdly, the physical shape of the antenna does not been changed and there is only one port, whereby the size is small.

DETAILED DESCRIPTION

The technical solutions in the embodiments of the present invention are clearly and completely described in the following with reference to the drawings in the embodiments of the present invention. It is obvious that the described embodiments are only a part of the embodiments of the present invention, and not all of the embodiments. All other embodiments obtained by those skilled in the art based on the embodiments of the present invention without creative efforts are within the scope of the present invention.

Figure 1:
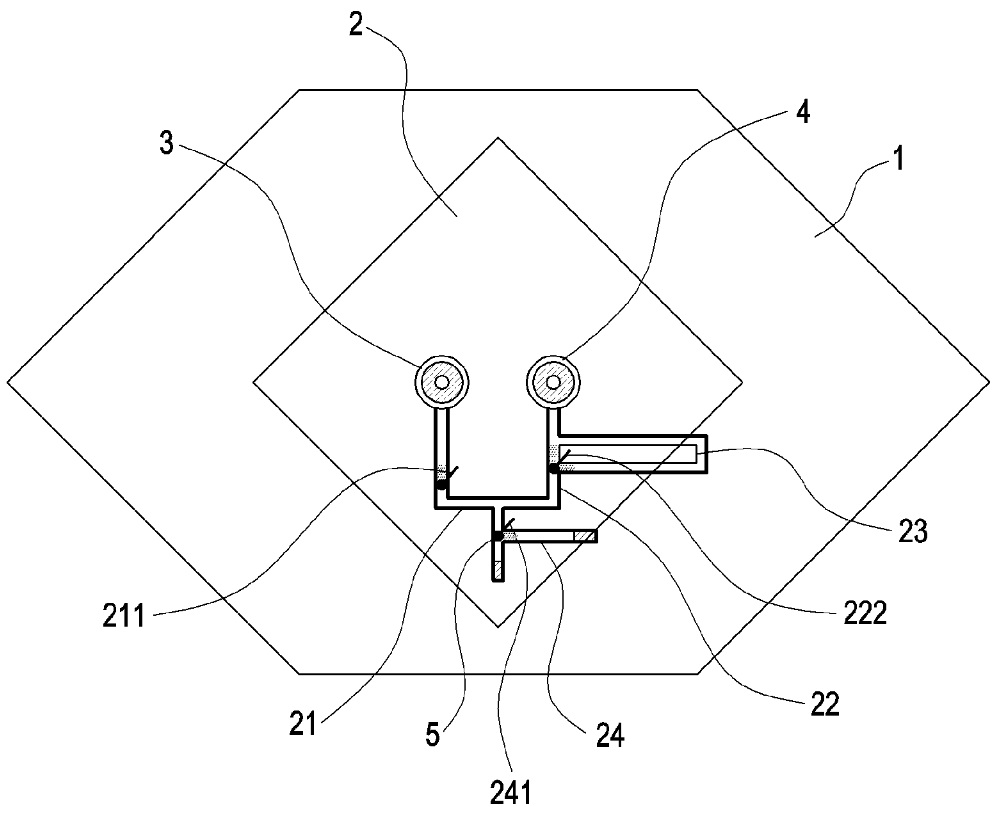
FIG. 1 is a schematic structural view of a first embodiment of a patch antenna structure with adjustable patterns according to the present invention.

Referring to FIG. 1, a first embodiment of a patch antenna structure of the present invention is shown.

The patch antenna structure with adjustable patterns in the embodiment includes: a metal substrate 1, a feeding patch 2 connected to the metal substrate 1, and a first feeding line 21 disposed on the feeding patch 2, a first feeding point 3 and a second feeding line 22 connected in the feeding line 21, and a second feeding point 4 connected in the second feeding line 22, the first feeding line 21 and the second feeding line 22 intersect at a node 5, wherein the length of the first feeding line 21 between the node 5 and the first feeding point 3 and the length of the second feeding line 22 between the node 5 to the second feeding point 4 are set equal; a switching component for changing the relative phase between the first feeding point 3 and the second feeding point 4 is provided in the first feeding line 21 and/or in the second feeding line 22, and the switching component includes any of a switching circuit, a phase shifter, and a 0 ohm resistor.

The switching component in this embodiment is a switching circuit, and the switching circuit includes: a first single-pole single-throw switch 211 disposed in the first feeding line 21 between the node 5 and the first feeding point 3, a single-pole double-throw switch 222 disposed in the second feeding line 22 between the node 5 and the second feeding point 4 and a third feeding line 23, the third feeding line 23 is connected to the single-pole double-throw switch 222 and the second feeding line 22 between the node 5 and the second feeding point 4, wherein the single-pole double-throw switch 222 controls whether the second feeding line 22 between the node 5 and the second feeding point 4 is connected to the third feeding line 23.

By setting the above switching circuit, that is, the selection of the corresponding first single-pole single-throw switch 211 and single-pole double-throw switch 222, the relative phase between the first feeding point 3 and the second feeding point 4 is changed.

Preferably, the third feeding line 23 is a feed transmission line that is bent by 180 degrees. The third feeding line 23 functions to change the length of the feeding line between the node 5 and the second feeding point 4, and add a third feeding line 23 to change the relative phase between the first feeding point 3 and the second feeding point 4.

The switching component in this embodiment is configured as a switching circuit. In this embodiment, the radiating element of the antenna remains unchanged during the switching process, and only the feeding circuit is switched, compared to the conventional pattern reconstruction, has the following unintended technical effects. For example, the control circuit such as the switch is arranged in the feeding circuit being away from the radiation unit, and has less influence on the radiation pattern, and the control circuit of the switch has a short wiring which is convenient for layout.

In addition, the switching circuit in this embodiment does not change the physical shape of the patch antenna, the patch antenna has only one port, and does not need to be an array, and the size is small, so that it is more intensive.

Further, the patch antenna structure with adjustable patterns in this embodiment further includes: an adjustment component for adjusting mismatch in relative phase switching process between the first feeding point 3 and the second feeding point 4. In particular, the adjustment component is a matching transmission line 24 that can be connected in the first feeding line 21 and/or in the second feeding line 22.

The adjustment component in this embodiment further includes a second single-pole single-throw switch 241 connected to the node 5, and the second single-pole single-throw switch 241 controls whether the matching transmission line 24 is connected to the first feeding line 21 and/or the second feeding line 22 through the node 5.

In the embodiment, when implementing the patch antenna structure with adjustable patterns, the second single-pole single-throw switch 241 is turned off, the first single-pole single-throw switch 211 is turned on, and the single-pole double-throw switch 222 is turned to the vertical direction, the length of the first feeding line 21 between the node 5 to the first feeding point 3 and the length of the second feeding line 22 between the node 5 to the second feeding point 4 are set equal, the first feeding point 3 and the second feeding point 4 is fed in phase, and the patch antenna produces an omnidirectional pattern.

When the second single-pole single-throw switch 241 is turned to the horizontal direction, the matching transmission line 24 is turned on, the first single-pole single-throw switch 21 is turned on, and the single-pole double-throw switch 222 is turned to the horizontal direction, the single-pole double-throw switch 222 controls the second feeding line 22 between the node 5 to the second feeding point 4 is connected to the third feeding line 23 which is bent by 180 degrees. That feeding line produces a 180 degree phase shift, the first feeding point 3 and the second feeding point 4 are fed in reverse, and the patch antenna produces a directional pattern.

In this process, the function that the second single-pole single-throw switch 241 is turned to the horizontal direction to turn on the matching transmission line 24 is to solve the mismatch problem generated after the third feeding line 23 which is bent by 180 degrees.

Figure 2:
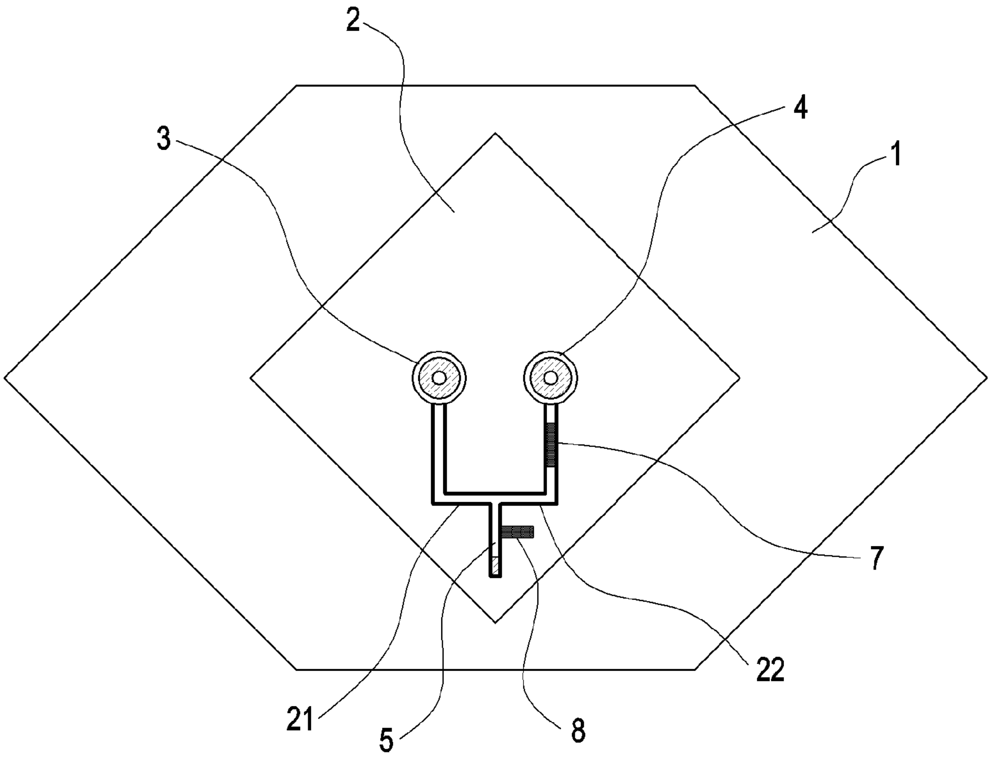
FIG. 2 is a schematic structural view of a second embodiment of a patch antenna structure with adjustable patterns according to the present invention.

Referring to FIG. 2, a second embodiment of a patch antenna structure of the present invention is shown.

The difference between this embodiment and the first embodiment is that the switching component is a phase shifter 7, and the phase shifter 7 can continuously change the relative phase between the first feeding point 3 and the second feeding point 4 from 0 degrees and 180 degrees, whereby the pattern is shifted from the horizontal omnidirectional to the vertical directional can be observed, which can be used as a beam scanning antenna to some extent.

Preferably, the adjusting component in this embodiment is an adjustable capacitor 8 for solving the mismatch problem during changing the relative phase between the first feeding point 3 and the second feeding point 4 by the phase shifter 7.

In the embodiment, the manner of adding the phase shifter 7 in the feeding circuit is the same as the manner and purpose of setting the switching circuit which includes the first single-pole single-throw switch 211, the single-pole double-throw switch 222, and the third feed line 23. The embodiment of the adjustable capacitor 8 is the same as the manner and purpose of setting the second single-pole single-throw switch 241 and the matching transmission line 24, so that the radiating element of the antenna remains unchanged during the switching process, and only the feeding circuit is switched. Compared to the traditional pattern reconstruction technology, the present embodiment has the following unintended technical effects. For example, the control circuit such as the switch is arranged in the feeding circuit being away from the radiation unit, and has less influence on the radiation pattern, and the control circuit of the switch has a short wiring which is convenient for layout.

In other embodiments of the patch antenna structure with adjustable patterns of the present invention, the switching circuit can be replaced by a 0 ohm resistor. In specific implementation, the 0 ohm resistor is disposed in the first feeding line 21 between the node 5 and the first feeding point 3 and/or in the second feeding line 22 between the node 5 and the second feeding point 4. The 0 ohm resistor is soldered only at the position where connection is required, and the position where the connection is not required is not processed. And the manner and the purpose are consistent with the embodiments and purposes of the first embodiment and the second embodiment.

The present invention also discloses an antenna feeder board which includes the above-mentioned patch antenna structure with adjustable patterns, and the implementation manner of the antenna feeder board is the same as that of the patch antenna structure with adjustable patterns, so the details are omitted here.

Performing the patch antenna structure and the antenna feeder board with adjustable patterns of the present invention will bring out the following beneficial effects:

Firstly, a switching component for changing a relative phase between the first feeding point and the second feeding point is provided in the first feeding line and/or in the second feeding line, and the switching component comprises any of a switching circuit, a phase shifter and a 0 ohm resistor and can switch or scan two patterns with a set of antennas by switching the switching component, simplifying design and saving costs.

Secondly, the switching circuit is arranged in the feeding circuit being away from the radiation element, and has less influence on the radiation pattern, and the control circuit of the switch has a short wiring which is convenient for layout.

Thirdly, the physical shape of the antenna does not been changed and there is only one port, whereby the size is small.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. A patch antenna comprising:

a metal substrate, a feeding patch connected to the metal substrate, a first feeding line disposed on the feeding patch, a first feeding point and a second feeding line connected in the first feeding line, and a second feeding point connected in the second feeding line, the first feeding line and the second feeding line intersect at a node; and a switching component for changing a phase between the first feeding point and the second feeding point, the switching component connected in at least one of the first feeding line or the second feeding line, wherein the switching component includes a first single-pole single-throw switch disposed in the first feeding line and a single-pole double-throw switch disposed in the second feeding line and a third feeding line, wherein, by the first single-pole single-throw switch turned on, the node and the first feeding point are connected via the first feeding line, and wherein, by the single-pole double-throw switch turned to a first direction, the node and the second feeding point are connected via the second feeding line, not via the third feeding line, or by the single-pole double-throw switch turned to a second direction, the node and the second feeding point are connected via the second feeding line and the third feeding line.

2. The patch antenna of claim 1, wherein a length of the first feeding line between the node and the first feeding point and a length of the second feeding line between the node and the second feeding point are set to be a same, and wherein the switching component includes at least one of a switching circuit, a phase shifter, or a 0 ohm resistor.

3. The patch antenna of claim 2, further comprising an adjustment component for adjusting mismatch in a phase switching process between the first feeding point and the second feeding point.

4. The patch antenna of claim 3, wherein the adjustment component includes a matching transmission line or an adjustable capacitor that is connected in the first feeding line or in the second feeding line.

5. The patch antenna of claim 1, wherein the third feeding line is a feed transmission line that is bent by 180 degrees.

6. The patch antenna of claim 3, wherein the adjustment component is a matching transmission line, wherein the adjustment component further includes a second single-pole single-throw switch connected to the node, and wherein the second single-pole single-throw switch is configured to determine whether the matching transmission line is connected to the node.

7. The patch antenna of claim 6, wherein, when the second single-pole single-throw switch is turned off, the first single-pole single-throw switch is turned on, wherein, when the single-pole double-throw switch is turned to the first direction, the first feeding point and the second feeding point are fed in a same phase, and wherein the patch antenna generates an omnidirectional pattern.

8. The patch antenna of claim 6, wherein, when the second single-pole single-throw switch is turned off, the first single-pole single-throw switch is turned on, wherein the single-pole double-throw switch is turned to the second direction, the first feeding point and the second feeding point are fed in a reverse direction, and wherein the patch antenna generates a directional pattern.

9. The patch antenna of claim 1, wherein the switching component comprises a 0 ohm resistor that is disposed in the first feeding line between the node and the first feeding point or in the second feeding line between the node and the second feeding point.

10. An antenna feeder board comprising:

a patch antenna comprising a metal substrate, a feeding patch connected to the metal substrate, a first feeding line disposed on the feeding patch, a first feeding point and a second feeding line connected in the first feeding line, and a second feeding point connected in the second feeding line, the first feeding line and the second feeding line intersect at a node, wherein a switching component for changing a phase between the first feeding point and the second feeding point is connected in at least one of the first feeding line or the second feeding line, wherein the switching component includes a first single-pole single-throw switch disposed in the first feeding line and a single-pole double-throw switch disposed in the second feeding line and a third feeding line, wherein, by the first single-pole single-throw switch turned on, the node and the first feeding point are connected via the first feeding line, and wherein, by the single-pole double-throw switch turned to a first direction, the node and the second feeding point are connected via the second feeding line, not via the third feeding line, or by the single-pole double-throw switch turned to a second direction, the node and the second feeding point are connected via the second feeding line and the third feeding line.

11. The antenna feeder board of claim 10, wherein a length of the first feeding line between the node and the first feeding point and a length of the second feeding line between the node and the second feeding point are set to be a same, and wherein the switching component includes at least one of a switching circuit, a phase shifter, or a 0 ohm resistor.

12. The antenna feeder board of claim 11, further comprising an adjustment component for adjusting mismatch in a phase switching process between the first feeding point and the second feeding point.

13. The antenna feeder board of claim 12, wherein the adjustment component includes a matching transmission line or an adjustable capacitor that is connected in the first feeding line or in the second feeding line.

14. The antenna feeder board of claim 10, wherein the third feeding line is a feed transmission line that is bent by 180 degrees.

15. The antenna feeder board of claim 12, wherein the adjustment component is a matching transmission line, wherein the adjustment component further includes a second single-pole single-throw switch connected to the node, and wherein the second single-pole single-throw switch is configured to determine whether the matching transmission line is connected to the node.

16. The antenna feeder board of claim 15, wherein, when the second single-pole single-throw switch is turned off, the first single-pole single-throw switch is turned on, wherein, when the single-pole double-throw switch is turned to the first direction, the first feeding point and the second feeding point are fed in a same phase, and wherein the patch antenna generates an omnidirectional pattern.

17. The antenna feeder board of claim 15, wherein, when the second single-pole single-throw switch is turned off, the first single-pole single-throw switch is turned on, wherein the single-pole double-throw switch is turned to the second direction, the first feeding point and the second feeding point are fed in a reverse direction, and wherein the patch antenna generates a directional pattern.

18. The antenna feeder board of claim 10, wherein the switching component comprises a 0 ohm resistor that is disposed in the first feeding line between the node and the first feeding point or in the second feeding line between the node and the second feeding point.

* * * * *